United States Patent
Kajaria et al.

(10) Patent No.: US 9,909,381 B2
(45) Date of Patent: Mar. 6, 2018

(54) HIGH PRESSURE ISOLATION SYSTEM FOR WELL STIMULATION THROUGH PRODUCTION TUBING

(71) Applicant: GE Oil & Gas Pressure Control LP, Houston, TX (US)

(72) Inventors: Saurabh Kajaria, Houston, TX (US); Khang V. Nguyen, Houston, TX (US); Todd B. Adams, Khobar (SA)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 698 days.

(21) Appl. No.: 13/944,467

(22) Filed: Jul. 17, 2013

(65) Prior Publication Data
US 2014/0020901 A1    Jan. 23, 2014

Related U.S. Application Data

(60) Provisional application No. 61/672,575, filed on Jul. 17, 2012.

(51) Int. Cl.
*E21B 33/037* (2006.01)
*E21B 33/03* (2006.01)
(Continued)

(52) U.S. Cl.
CPC .......... *E21B 33/037* (2013.01); *E21B 33/03* (2013.01); *E21B 33/068* (2013.01); *E21B 43/26* (2013.01); *F16J 15/46* (2013.01)

(58) Field of Classification Search
CPC ...... E21B 33/037; E21B 33/04; E21B 33/068; E21B 43/26
See application file for complete search history.

(56) References Cited

U.S. PATENT DOCUMENTS 3,294,243 A * 12/1966 Cerles .................. B01D 33/801
                                                        210/402
4,076,079 A    2/1978 Herricks et al.
(Continued)

FOREIGN PATENT DOCUMENTS

CA    1056721 A1    6/1979
CA    2358242 A1    4/2003
(Continued)

OTHER PUBLICATIONS

PCT Search Report and Written Opinion dated Feb. 25, 2014 from corresponding Application No. PCT/US2013/050883.
(Continued)

*Primary Examiner* — Giovanna C. Wright
*Assistant Examiner* — Tara E Schimpf
(74) *Attorney, Agent, or Firm* — Hogan Lovells US, LLP

(57) ABSTRACT

A fracturing system includes a fracturing spool that mounts onto a wellhead assembly for injecting fracturing fluid into a well beneath the wellhead assembly. The fracturing system includes an isolation sleeve and fracturing spool. The isolation sleeve inserts in an axial bore of the fracturing spool, and has a lower end that extends into the wellhead to isolate and protect portions of the wellhead assembly from the fracturing fluid. A groove in an inner surface of the fracturing spool receives an annular seal for sealing between the isolation sleeve and fracturing spool. Injecting a viscous fluid into the groove energizes the seal, and blocks high pressure fracturing fluid from flowing between the isolation sleeve and fracturing spool.

13 Claims, 3 Drawing Sheets

(51) Int. Cl.
*E21B 43/26* (2006.01)
*F16J 15/46* (2006.01)
*E21B 33/068* (2006.01)

(56) References Cited

U.S. PATENT DOCUMENTS

| | | | |
|---|---|---|---|
| 4,206,929 A | 6/1980 | Bruce | |
| 5,180,008 A * | 1/1993 | Aldridge | E21B 33/03 166/84.1 |
| 7,490,666 B2 | 2/2009 | Swagerty et al. | |
| 7,578,351 B2 | 8/2009 | Dallas | |
| 7,806,175 B2 | 10/2010 | Hickie | |
| 7,857,062 B2 | 12/2010 | Dallas | |
| 2003/0111799 A1 * | 6/2003 | Gilmore | E21B 17/07 277/510 |
| 2006/0185841 A1 | 8/2006 | Swagerty et al. | |
| 2008/0087439 A1 | 4/2008 | Dallas | |
| 2008/0277120 A1 | 11/2008 | Hickie | |
| 2009/0090515 A1 * | 4/2009 | Chan | E21B 43/26 166/382 |
| 2009/0283277 A1 | 11/2009 | Dallas | |
| 2010/0051261 A1 * | 3/2010 | Koleilat | E21B 33/068 166/177.5 |
| 2011/0108275 A1 * | 5/2011 | Borak | E21B 17/1007 166/308.1 |
| 2011/0155367 A1 | 6/2011 | Swagerty et al. | |
| 2014/0060805 A1 * | 3/2014 | Campbell | E21B 33/03 166/75.11 |

FOREIGN PATENT DOCUMENTS

| | | |
|---|---|---|
| CA | 2406842 A1 | 4/2003 |
| CN | 2045777 U | 10/1989 |
| CN | 2156283 Y | 2/1994 |

OTHER PUBLICATIONS

Office Action issued in connection with corresponding CN Application No. 201380048352.8 dated Mar. 2, 2016.

* cited by examiner

HIGH PRESSURE ISOLATION SYSTEM FOR WELL STIMULATION THROUGH PRODUCTION TUBING

CROSS REFERENCE TO RELATED APPLICATIONS

This application claims priority to and the benefit of U.S. Provisional Application Ser. No. 61/672,575, filed Jul. 17, 2012, the full disclosure of which is hereby incorporated by reference herein for all purposes.

BACKGROUND OF THE INVENTION

1. Field of the Invention

The present disclosure relates in general to an isolation sleeve employed during hydraulic fracturing operations through production tubing to protect the wellhead from the high fracturing pressure, and in particular to a sleeve assembly that does not require lockdown screws.

2. Description of Prior Art

One type of treatment for an oil or gas well is referred to as well fracturing or a well "frac." In a typical fracing operation, an adapter is connected to the upper end of a wellhead member, and high pressure liquid is pumped down the well to create fractures in the earth formation. Proppant material is often included in the fracturing fluid, which enters the fractures to maintain them open after the high pressure is removed. Hydraulic fracturing is particularly useful for hydrocarbon bearing earth formations with low permeability and adequate porosity, as the entrained hydrocarbons can flow more easily through the fractures created in the earth formation.

Fracing fluid pressure often ranges up to pressures of 8,000 to 9,000 psi; whereas normal wellhead operating pressure may be a few hundred to a few thousand psi. Accordingly, fracing pressures usually exceed pressure ratings of the wellhead and its associated valves. Moreover, additives to the frac fluid, such as the proppant, can be very abrasive and damaging to parts, of the wellhead. Isolation sleeves are sometimes used to address the issues of overpressure and fluid erosion. Generally, isolation sleeves seal between an adapter above the wellhead and the casing or tubing extending into the well.

SUMMARY OF THE INVENTION

Disclosed herein is an example of a fracturing system for fracturing a wellbore. In one embodiment, the system includes a fracturing spool selectively coupled to a wellhead assembly mounted on the wellbore, an axial bore in the fracturing spool that is in communication with the wellbore and which defines an inner surface in the fracturing spool, an isolation sleeve coaxially disposed in the axial bore and that extends into a main bore in the wellhead assembly, and a seal assembly. The seal assembly includes a groove in the inner surface of the fracturing spool that circumscribes the axial bore, a port in the fracturing spool that intersects the groove and that is in communication with a fluid supply, and a seal member in the groove, so that when pressurized fluid from the fluid supply is directed into the groove, the seal member is urged radially inward into sealing contact with the isolation sleeve. A means for monitoring pressure in the axial bore and adjacent the seal assembly can be included. The seal assembly can be made up of an upper seal assembly, where the groove is an upper groove, the port is an upper port, and the seal member is an upper seal member, and further included is a lower seal assembly axially spaced from the upper seal assembly and which includes a lower groove in the inner surface of the fracturing spool that circumscribes the axial bore, a lower port in the fracturing spool that intersects the lower groove and that is in communication with the fluid supply, and a lower seal member in the lower groove. Further included in this example is a monitoring port in fluid communication with the axial bore between the upper and lower seal assemblies. Threads may optionally be included on a lower end of the isolation sleeve that selectively engage with threads formed on a component in the wellhead assembly. In this example the component in the wellhead assembly is a tubing hanger. The seal member can be transformed from an un-energized configuration to an energized configuration when the pressurized fluid is directed into the groove, and wherein the seal member has an inner diameter when in the un-energized configuration that is at least that of an inner diameter of the axial bore and is set back from interfering contact with items inserted into the axial bore. Further optionally included is a supply of fracturing fluid in communication with the fracturing spool.

Also disclosed is an example of a fracturing system for fracturing a wellbore, which includes a fracturing spool selectively mounted onto a wellhead assembly that is installed over the wellbore. An axial bore in the fracturing spool is in communication with a main bore in the wellhead assembly, and an annular isolation sleeve inserts in the axial bore. The isolation sleeve has an upper end in communication with a source of fracturing fluid and a lower end fastened to a component of the wellhead assembly. A seal member is included in a groove in the fracturing spool that circumscribes the axial bore, and that selectively converts from an un-energized configuration to an energized configuration. When energized the seal member forms a sealing barrier between the isolation sleeve and outer surface of the axial bore. The fracturing system can also include an injection passage for delivering a pressurized fluid to the groove to energize the seal member. In this example, the injection passage is an upper injection passage, the seal member is an upper seal member, and the groove is an upper groove, and where the fracturing system further includes a lower seal member set in a lower groove, and a lower injection passage for delivering pressurized fluid to the lower groove. Further optionally included is a monitoring passage for monitoring pressure in the axial bore between the upper and lower grooves. In an example, when the seal member is in the un-energized configuration, items are selectively insertable into the axial bore, which have a diameter up to a diameter of the axial bore.

Also disclosed is an example of a method of fracturing a wellbore with a fracturing fluid, where the method includes providing an annular isolation sleeve, inserting the isolation sleeve into an axial bore in a fracturing spool that is mounted onto a wellhead assembly to shield a component within the wellhead assembly from the fracturing fluid, attaching the isolation sleeve to a component within the wellhead assembly, sealing between the isolation sleeve and an outer circumference of the axial bore by urging a seal member radially inward from the fracturing spool, and delivering fracturing fluid through the isolation sleeve and to the wellbore to fracture the wellbore. The seal member of the example method can be housed in a groove, and can be urged radially inward by introducing a pressurized fluid into the groove. The component within the wellhead assembly can be a tubing hanger, and wherein the step of attaching the isolation to the component involves engaging threads on a lower end of the isolation sleeve with threads on the tubing hanger.

BRIEF DESCRIPTION OF THE DRAWINGS

Some of the features and benefits of the present invention having been stated, others will become apparent as the description proceeds when taken in conjunction with the accompanying drawings, in which.

Figure 1:
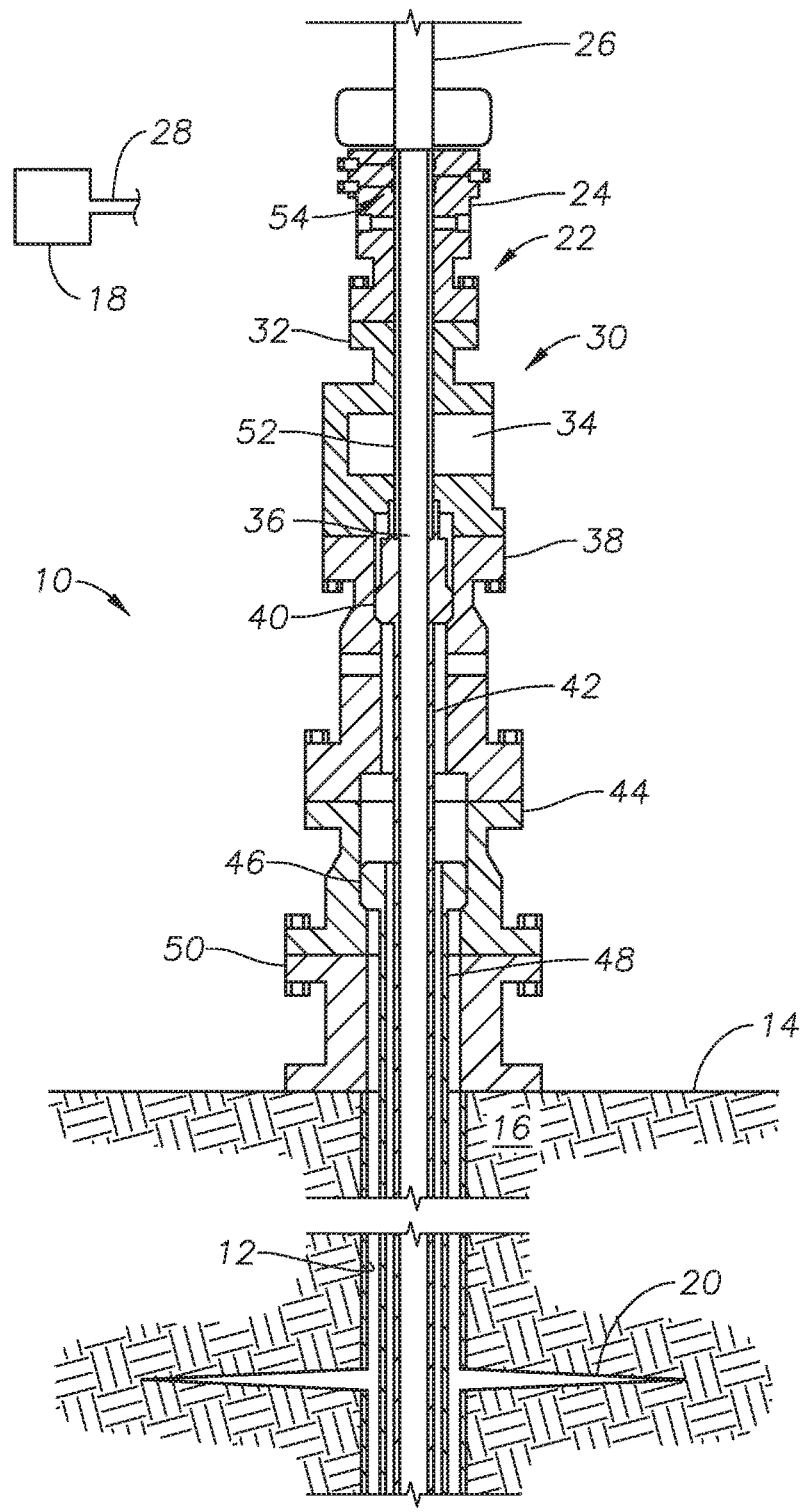
FIG. 1 is a side sectional view of an example of a wellhead assembly with an isolation sleeve in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows in side section view an example of a wellhead assembly 10 mounted over a wellbore 12 and on a surface 14. Wellbore 12 intersects a formation 16 shown below surface 14 and which is in communication with a fracturing fluid from a fracturing fluid source 18. Delivering fluid into wellbore 12 creates fractures 20 within the formation 16. A fracturing system 22 is mounted on the wellhead assembly 10 which includes a fracturing spool 24 in fluid communication with line 26 for delivering the fracturing fluid to the wellbore 12. Line 28 shown connecting to fracturing fluid source 18 and also communicates with line 26. Fracturing spool 24, which is an annular member, mounts onto a production valve 30 which is part of the wellhead assembly 10. Production valve 30 includes a valve body 34, shown having a laterally formed cavity 34 for housing a production valve (not shown). Cavity 34 is intersected by an axially formed main bore 36 that extends the length of wellhead assembly 10 and in communication with wellbore 12. In the example of FIG. 1, production valve body 32 is set on an annular tubing spool 38, which is for housing a tubing hanger 40 shown coaxially set within spool 38. Production tubing 42 depends downward from tubing hanger 40 and into wellbore 12. Below tubing spool 38 is casing spool 44 which is equipped with a casing hanger 46 for supporting a string of casing 48 that also extends into wellbore 12 and circumscribes tubing 42. A base spool 50 provides a support on which casing spool 44 is mounted and shown set on surface 14.

An annular isolation sleeve 52 is inserted within an axial bore 53 of fracturing spool 24 and has a lower end that terminates coaxially within tubing hanger 40. As will be described in further detail below, lower end of isolation sleeve 52 threadingly couples to tubing hanger 40 in one embodiment. Fracturing system 22 further includes a seal assembly 54 that selectively provides sealing between isolation sleeve 52 and fracturing spool 24.

Figure 2:
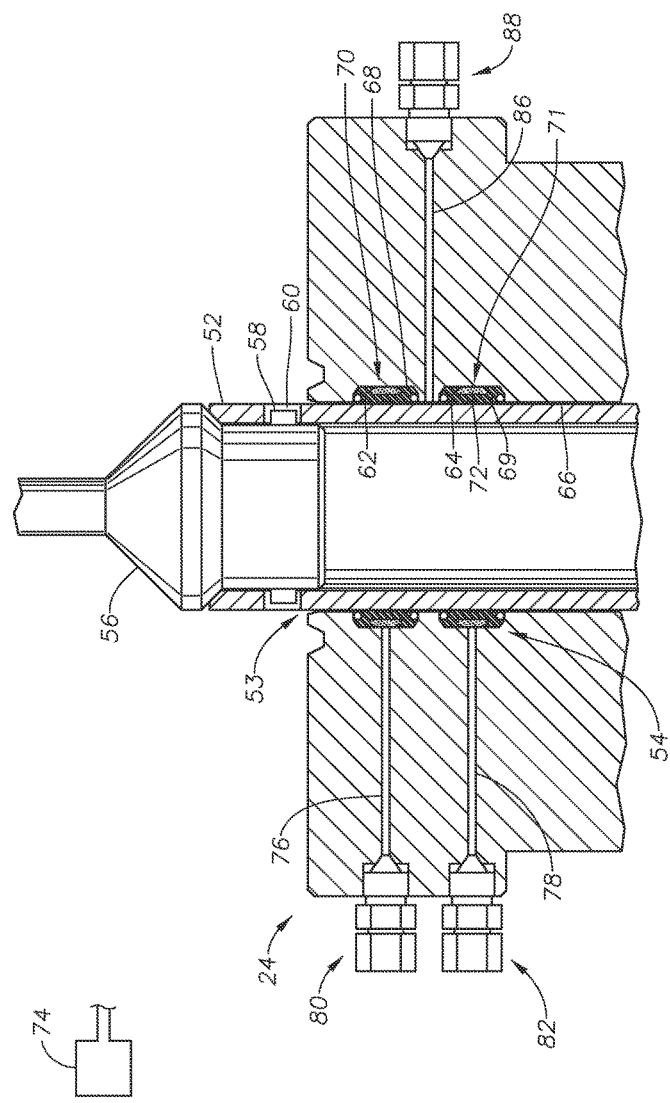
FIG. 2 is an enlarged side sectional view of an upper portion of the isolation sleeve of the example of FIG. 1 and in accordance with the present invention.

FIG. 2 illustrates in side sectional view an example of an upper portion of fracturing spool 24 with isolation sleeve 52 inserted therein. As shown, a running tool 56 is included and used for inserting isolation sleeve 52 within axial bore 53. Running tool 56 is equipped with a J-lug 58 that selectively engages a slot 60 that is formed on an inner surface of isolation sleeve 52. Upper and lower grooves 62, 64 are shown formed into an inner surface 66 of fracturing spool 24 and which project radially outward from axial bore 53. Injection seals 68, 69 are provided in each of the upper and lower grooves 62, 64 where injection seals 68, 69 each include a cavity 70, 71 running along an outer radial circumference. In the example of FIG. 2, a viscous fluid 72 is injected into grooves 62, 64 which urges injection seals 68, 69 radially inward and into sealing contact within outer surface of isolation sleeve 52. In the example of FIG. 2, the fluid 72 can optionally be provided from a fluid source 74 that is in fluid communication with injection passages 76, 78 that respectfully intersect upper and lower grooves 62, 64. Passages 76, 78 extend radially through the body of fracturing spool 24; injection fittings 80, 82 are shown inserted where passages 76, 78 intersect the outer surface of fracturing spool 24. In one example, fittings 80, 82 may be closed thereby trapping pressurized fluid 72 within grooves 62, 64 and passages 76, 78 so that communication with fluid source 74 may be removed. Further shown in the example of FIG. 2 is a monitor passage 86 that extends from an outer surface of fracturing spool 24 and into inner surface 66. In the example shown, monitor passage 86 is disposed between upper and lower grooves 62, 64. A monitor fitting 88 is shown at the outer terminal end of monitor passage 86 and on which a pressure sensor or other monitoring element may be coupled for monitoring pressure between grooves 62, 64. In one example, monitoring pressure between grooves 62, 64 is useful for indicating leakage across seal assembly 64.

Figure 3:
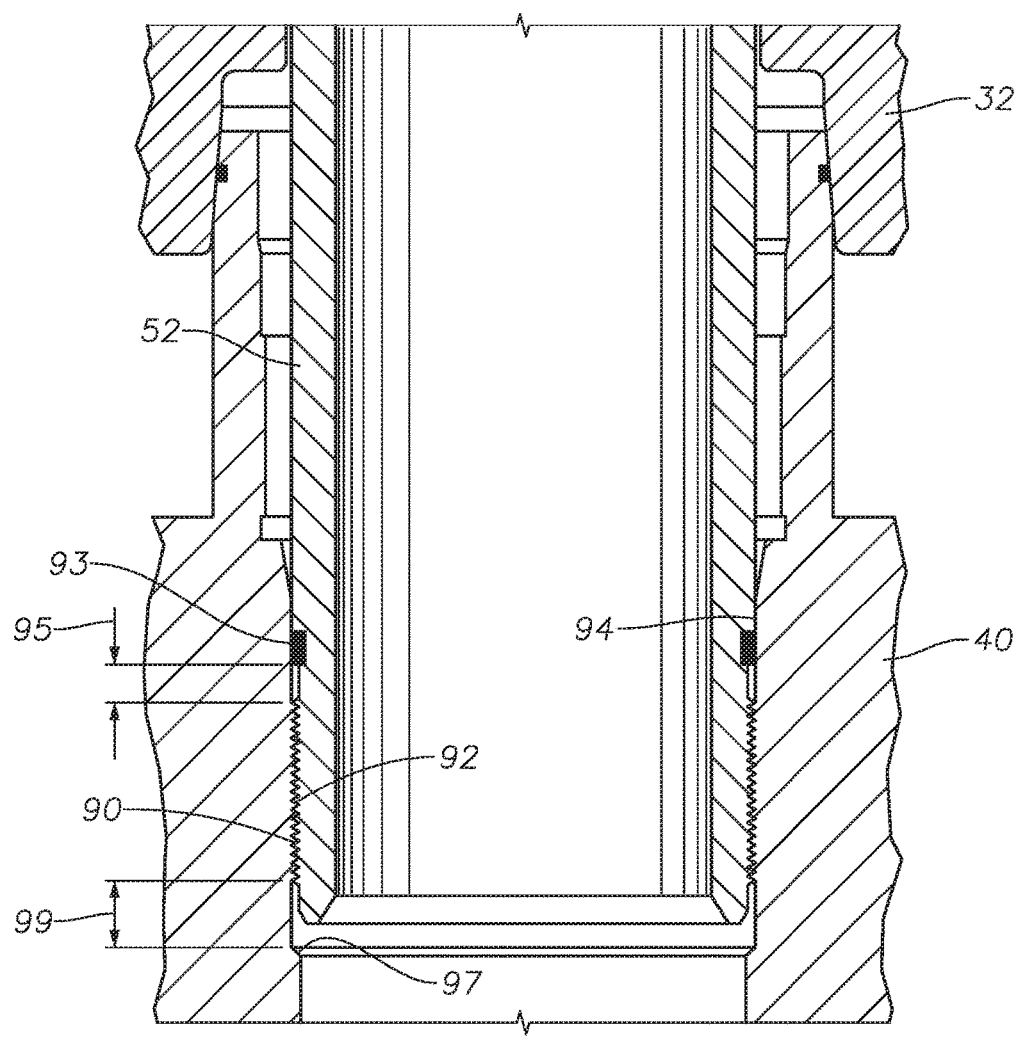
FIG. 3 is an enlarged side sectional view of a lower portion of the isolation sleeve of the example of FIG. 1 and in accordance with the present invention.

FIG. 3 is a side sectional view of a lower end of isolation sleeve 52 and where it is adjacent tubing hanger 40. In this example, threads 90 are shown formed on an outer surface of the lower end of isolation sleeve 52 and which threadingly engage threads 92 formed along a portion of the inner surface of tubing hanger 40. Thus in this example, the isolation sleeve 52 is coupled with a component within wellhead assembly 10 (FIG. 1) thereby anchoring isolation sleeve 52 within wellhead assembly 10. A seal ring 93 is located in a groove on the exterior of isolation sleeve 52 for sealing engagement with bore 94 of hanger 40. There is no structure on fracturing spool 24 (FIG. 2), isolation sleeve 52 or in hanger bore 40 that would prevent seal ring 93 from contacting hanger bore threads 92 if isolation sleeve 52 is rotated sufficiently while threads 90 are engaging threads 92.

As isolation sleeve 52 is rotated into threaded engagement with hanger bore threads 92, seal ring 93 is located a distance 95 above hanger bore threads 92 that decreases as the rotation continues. Bore 94 of hanger 40 has an upward facing shoulder 97. The lower end of isolation sleeve threads 90 is spaced a distance 99 below hanger threads 92 as isolation sleeve thread 90 are threaded into hanger bore threads 92. Distance 99 is greater than distance 95. Unlike other example fracturing systems that employ lugs or other bolts in the fracturing spool, utilizing connections within the wellhead assembly allows for larger diameter components to be inserted through fracturing system. As is known, the presence of isolation sleeve 52 shields components within wellhead assembly 10 from the damaging effects of the high pressure and abrasive fracturing fluid.

In one example of operation, running tool 56 lowers isolation sleeve 52 into axial bore 53 (FIG. 2). Isolation sleeve 52 is anchored within wellhead assembly by threaded engagement between threads 90, 92 (FIG. 3). Injecting pressurized fluid from fluid source 74 into passages 76, 78 and grooves 62, 64 creates a seal between fracturing spool 24 and outer surface of isolation sleeve 52. After removing running tool 56, line 26 may be coupled with fracturing spool 24 and fracturing fluid may be conveyed through line 26 and into wellbore 12 for creating fractures 20 with formation 16. Bleed off ports (not shown) maybe included to allow air to escape from within grooves 62, 64 and passages 76, 78 as the pressurized fluid 72 is introduced therein. In one example, the viscos fluid 72 includes fibrous material for maintaining pressure therein.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A fracturing system for fracturing a wellbore through production tubing, comprising:
    a wellhead assembly for installing over the wellbore, the wellhead assembly having a main bore with a longitudinal axis;
    a hanger supported in the main bore, the hanger having a hanger bore containing a set of hanger threads;
    a fracturing spool selectively mounted on the wellhead assembly;
    a spool bore in the fracturing spool that is in communication with the main bore and which defines an inner surface in the fracturing spool;
    an isolation sleeve coaxially disposed in the spool bore and having a lower end that extends into the hanger bore, the isolation sleeve having isolation sleeve threads on the lower end of the isolation sleeve that selectively engage the hanger threads, the isolation sleeve having an isolation sleeve seal ring on an exterior portion of the lower end above the isolation sleeve threads that seals against the hanger bore, and a seal ring groove receiving the seal ring, the seal ring groove having a groove diameter that is less than a first diameter of the isolation sleeve adjacent a top of the seal ring groove and less than a second diameter of the isolation sleeve directly adjacent a bottom of the seal ring groove, the first diameter being greater than the second diameter;
    a seal assembly comprising, a groove in the inner surface of the fracturing spool that circumscribes the spool bore, a port in the fracturing spool that intersects the groove and that is in communication with a fluid supply, and a seal member in the groove, so that when pressurized fluid from the fluid supply is directed into the groove, the seal member is urged radially inward into sealing contact with the isolation sleeve, the seal member operable to contact the isolation sleeve only after the isolation sleeve threads are fully made up with the hanger threads and the isolation sleeve is static relative to the fracturing spool.

2. The fracturing system of claim 1, further comprising a means for monitoring pressure in the spool bore and adjacent the seal assembly.

3. The fracturing system of claim 1, wherein the seal assembly comprises an upper seal assembly, the groove comprises an upper groove, the port comprises an upper port, the seal member comprises an upper seal member, and
    wherein further included is a lower seal assembly axially spaced from the upper seal assembly and which comprises a lower groove in the inner surface of the fracturing spool that circumscribes the spool bore, a lower port in the fracturing spool that intersects the lower groove and that is in communication with the fluid supply, and a lower seal member in the lower groove, and
    wherein further included is a monitoring port in fluid communication with the spool bore between the upper and lower seal assemblies.

4. The fracturing system of claim 1, wherein the seal member is transformed from an un-energized configuration to an energized configuration when the pressurized fluid is directed into the groove, and wherein the seal member has an inner diameter when in the un-energized configuration that is at least that of an inner diameter of the spool bore and is set back from interfering contact with the wellbore components inserted into the spool bore.

5. The fracturing system of claim 1, wherein the seal member comprises a cavity along an outer radial circumference.

6. A fracturing system for fracturing a wellbore through production tubing, comprising:
    a wellhead assembly for installing over the wellbore, the wellhead assembly having a main bore with a longitudinal axis;
    a hanger supported in the main bore, the hanger having a hanger bore containing a set of hanger threads;
    a fracturing spool selectively mounted onto the wellhead assembly and having a spool bore in communication with the main bore in the wellhead assembly;
    an annular isolation sleeve inserted in the spool bore and having an upper end in communication with a source of fracturing fluid and having a lower end inserted into the hanger bore, the isolation sleeve having a set of isolation sleeve threads adjacent the lower end of the isolation sleeve that selectively engage the hanger threads;
    an isolation sleeve seal ring on an exterior of the isolation sleeve that seals with the hanger bore, the isolation sleeve seal ring positioned within a seal ring groove;
    a reduced diameter portion of the isolation sleeve, the reduced diameter portion arranged between the seal ring groove and the threads and having a smaller outer diameter directly adjacent a bottom of the seal ring groove than an outer diameter of the isolation sleeve adjacent a top of the seal ring groove; and a seal member that selectively converts from an un-energized configuration and disposed in a groove in the fracturing spool that circumscribes the spool bore, to an energized configuration that forms a sealing barrier between the isolation sleeve and the spool, the seal member operable to contact the isolation sleeve only after the isolation sleeve threads are fully made up with the hanger threads and the isolation sleeve is static relative to the fracturing spool.

7. The fracturing system of claim 6, further comprising an injection passage in the fracturing spool for delivering a pressurized fluid to the groove to energize the seal member.

8. The fracturing system of claim 7, wherein the injection passage comprises an upper injection passage, the seal member comprises an upper seal member, and the groove comprises an upper groove, the fracturing system further comprising a lower seal member set in a lower groove, and a lower injection passage for delivering pressurized fluid to the lower groove.

9. The fracturing system of claim 8, further comprising a monitoring passage for monitoring pressure in the spool bore between the upper and lower grooves.

10. The fracturing system of claim 6, wherein when in the un-energized configuration of the seal member and prior to installing the isolation sleeve, wellbore components are selectively insertable into the spool bore that have a diameter up to a diameter of the spool bore.

11. A method of fracturing a wellbore with a fracturing fluid through a wellhead assembly having a main bore with a longitudinal axis, a hanger in the main bore, and production tubing in the main bore, the method comprising:

providing in a hanger bore of the hanger a set of hanger threads;

providing a fracturing spool with a spool bore and a radially movable seal member surrounding the spool bore, and mounting the fracturing spool on the wellhead assembly;

providing an annular isolation sleeve with isolation sleeve threads adjacent a lower end of the isolation sleeve and an isolation sleeve seal ring on an exterior of the isolation sleeve;

inserting the isolation sleeve into the spool bore and the lower end of the isolation sleeve into the hanger bore and sealingly engaging the isolation sleeve seal ring with the hanger bore to shield a component within the wellhead assembly from the fracturing fluid;

engaging the isolation sleeve threads with the hanger threads by rotating the isolation sleeve relative to the hanger, wherein the isolation sleeve includes a reduced diameter portion directly below the isolation sleeve seal ring and above the isolation sleeve threads, the reduced diameter portion having a smaller diameter than an isolation sleeve diameter above the isolation sleeve seal ring; then sealing between the isolation sleeve and an outer circumference of the axial bore by urging the seal member radially inward into the fracturing spool bore, wherein the seal member contacts the isolation sleeve only after the isolation sleeve threads are fully made up with the hanger threads and the isolation sleeve is static relative to the fracturing spool; and delivering fracturing fluid through the isolation sleeve and to the wellbore to fracture the wellbore.

12. The method of claim 11, wherein the seal member is housed in a groove in the spool bore and is urged radially inward by introducing a pressurized fluid into the groove.

13. The method of claim 11, wherein sealing between the isolation sleeve and outer circumference of the axial bore further comprises introducing pressurized fluid to bear against a cavity formed along an outer radial circumference of the seal member.

* * * * *